United States Patent [19]
Blom

[11] Patent Number: 6,113,283
[45] Date of Patent: Sep. 5, 2000

[54] OPTICAL CAPSULE HAVING A CONNECTOR

[75] Inventor: Claes Blom, Skänninge, Sweden

[73] Assignee: Telefonaktiebolaget LM Ericsson, Stockholm, Sweden

[21] Appl. No.: 09/079,301

[22] Filed: May 15, 1998

[30] Foreign Application Priority Data

May 15, 1997 [SE] Sweden ................................. 9701833

[51] Int. Cl.[7] ....................................................... G02B 6/42
[52] U.S. Cl. ................................................. 385/92; 385/88
[58] Field of Search ......................................... 385/88–94

[56] References Cited

U.S. PATENT DOCUMENTS

| 4,461,537 | 7/1984 | Raymer, II et al. | 385/88 |
| 5,050,953 | 9/1991 | Anderson et al. | 385/89 |
| 5,151,961 | 9/1992 | Hvezda et al. | 385/92 X |
| 5,195,156 | 3/1993 | Freeman et al. | 385/92 |
| 5,337,398 | 8/1994 | Benzoni et al. | 385/90 |
| 5,452,390 | 9/1995 | Bechtel et al. | 385/92 |
| 5,586,207 | 12/1996 | Goodwin | 385/92 |
| 5,617,495 | 4/1997 | Funabashi et al. | 385/92 |

FOREIGN PATENT DOCUMENTS 0 125 499  11/1984  European Pat. Off. .

Primary Examiner—John D. Lee
Attorney, Agent, or Firm—Burns, Doane, Swecker & Mathis, L.L.P.

[57] ABSTRACT

An optoelectric capsule has a recess at one of its short sides. In the recess a ferrule projects, which contains an optical fiber, which is in contact with an optoelement inside the capsule. The ferrule can come in contact with a similar ferrule, which is elastically arranged in the house of a connector. An alignment of the ferrules with each other is obtained by means of a slotted, elastic tube. The house of the connector has at its front-side a flange, which can engage in the recess of the capsule when rotating the house. A locking action after rotating the flange 90° in the recess is obtained by the method that the inner surfaces in the recess, that retains the flange, have a convex shape whereas the rear surface of the flange has a corresponding concave shape. The connector can in that way be easily attached to the capsule and detached therefrom. Thereby a capsule is obtained having a simple optical connection not using any integrated pigtail, which could cause problems when handling and mounting the capsule on a circuit board.

14 Claims, 1 Drawing Sheet

OPTICAL CAPSULE HAVING A CONNECTOR

The present invention relates to optical contacting means, in particular a device for contacting at least two optical fibers with each other, such as an optical fiber included in an encapsulated optical component, i.e. an optical capsule, and a free optical fiber carrying a connector.

BACKGROUND

Encapsulated optical components including wave guides, connector means, etc. connected thereto are generally used within the field of optical communication, in which signals are transmitted mostly by means of optical fibers. In order to expand the use of optical transmission of signals it would be advantageous if components and connectors could be manufactured at lower costs and that the costs for mounting them could be reduced. One of the most important reasons for the high costs of such components is the extreme mechanical precision required when aligning an optoelectrical component with a wave guide such as an optical fiber and when aligning a wave guide in a component with another wave guide.

Thus, plastic capsules containing optoelectrical components and having an integrated optical interface are presently used together with matched connector means coupled to individual optical fibers or to ribbon fibers. The term component is here principally used for a finished product to be mounted on for example a circuit board or similar device and a component is then built of a number of building elements. Optoelectric modules and submodules constitute one type of components.

Optoelectrical commercial components are often provided with a fiber tail or "pigtail", which is an optical fiber extending from the interior of the component and having a free length outside the component. Thus, the fiber tail has one of its ends located inside the component and at this inner end usually an interface to some optoelectrical circuit or to a lens is provided. At the other end of the fiber tail, at the free or exterior end thereof, often some optical connector is mounted.

Such a fiber tail, i.e. a piece of an optical fiber, which at one of its ends is to be in contact with an optoelectrical circuit and which at its other end possibly already has a mounted optical connector, generally constitutes a significant obstacle in the case where one wants to manufacture modules or submodules in a cost-efficient way. This obstacle comprises that the optical fiber tail in a purely physical manner is hindering in automated production, what can result in disturbances of the production. In an encapsulating process in an injection moulding machine, when an encapsulating plastics material is moulded to enclose the optoelectrical circuit together with the inner portion of the fiber tail and when thereafter a curing operation of the plastics material is to be executed, there is a risk of obtaining damages to the polymer coating or sleeve of the optical fiber owing to the high temperatures used. Furthermore, equipment designed for automated production, such as machines for automatic mounting of circuits on circuit boards, will owing to their more complex design have a higher price in the case, where such equipment also is to handle circuits having projecting fiber tails.

The published European patent application EP-A-2 0 125 499 and U.S. Pat. No. 5,452,390 disclose connectors for optical fibers comprising ferrules, in which the fiber ends are pressed against each other for establishing contact between the ends. The pressing force is partly produced by springs of various types which for example act on one of the ferrules and press it towards the other ferrule. In the cited U.S. patent a slotted, resilient sleeve or tube is used for aligning the ferrules with each other.

U.S. Pat. No. 5,617,495 discloses a connection structure for an optical device having a ferrule extending from a package. Around the ferrule a fastening block may be provided having cleat portions arranged to cooperate with flange portions of a bent plate spring. When connecting the device the spring is pressed downwards to engage the fastening block. An optical fiber connector assembly is disclosed in U.S. Pat. No. 5,195,156 using a pin cooperating with a locking slot for securing the two parts of the assembly to each other.

SUMMARY

It is an object of the invention to provide an optical capsule having no projecting parts such as a integrated fiber tail but having a simple structure for connecting to a separate optical fiber.

It is in particular an object of the invention to provide an optical capsule and an optical connector allowing optical fibers therein to be connected to each other by a simple movement of the connector in relation to the capsule.

Thus, an optoelectrical capsule has the shape of a rather thin rectangular plate or generally a plate-shaped body comprising a specially designed recess or cut-out adapted for locking a connector at one of its edges or sides, for example at one of its short sides. The recess extends through the whole thickness of the plate or body. From the recess, from the inner centre thereof a cylindrical ferrule projects in the plane of the plate. The ferrule is rigidly attached to the capsule and has a direction perpendicular to said edge of the plate and it contains an optical fiber, which is in optical contact with an optoelement inside the capsule. The ferrule and the fiber contained therein can come in contact with a similar ferrule, which is elastically arranged in the housing of a connector and houses another optical fiber. An alignment of the ferrules with each other is achieved by means of a slotted tube made of an elastic material, so that when the ferrules with their front free surfaces are brought against each other a very accurate alignment of the ferrules and thus of the fibers contained in the ferrules is obtained. Then the front end surfaces of the fibers will be located opposite each other and in mechanical and optical contact with each other. In such an optical interface comprising two aligned ferrules in contact with each other the end surfaces of the optical fibers are easily accessible in the case where they are to be polished.

The housing of the connector has at its front side a portion protruding laterally, i.e. in directions perpendicular to the longitudinal direction of the connector and in particular of its ferrule and concentrically enclosed fiber, this portion being called a flange. The flange can engage in the recess in the capsule and be locked therein when rotating the housing. The locking operation in the recess after rotating the flange by an angle of about 90° is obtained partly by an elastic action which is obtained by elastically biassing the ferrule of the connector in a direction towards its front position, whereby, owing to the contact between the front surfaces of the two ferrules, the flange of the connector is pressed backwards, partly by the fact that those inner surfaces in the recess which retain the flange has a convex or ridge-like configuration and the rear surface of the flange has a corresponding concave or groove-shaped configuration.

The connector can in this way be mounted to the capsule in a detachable way and thus be detached therefrom. An optical capsule is thereby obtained having a simple optical connection and not comprising an integrated fiber tail which could cause problems when handling and mounting the optical capsule on a circuit board. The connector comprising the fiber contained in its ferrule can then possibly be designed as a detachable and replaceable "fiber tail" or "pig tail".

By the fact that one of the two ferrules, which form the optical interface, is placed directly outside a front surface of the encapsulated optoelectrical component and the other ferrule of the interface is placed inside a free connector, thus the two optical fibers can in a cost-efficient way be aligned with each other. In order to maintain, in the contact position, the contact between a fiber end in each ferrule the plastics capsule and the connector are designed so that they are retained in the contact position with each other by arranging an elastic action and by means of co-operating locking surfaces on the capsule of the component and on the connector, the locking surfaces providing some resistance to detaching the ferrules from each other by a rotating or turning operation. The connector is detached from the capsule by pressing the connector towards the capsule and then turning it through a suitable angle.

In such a device, as has been observed above, the free end of the fiber in the component and of the connector are easily accessible for polishing. An alignment of the two ferrules with each other is achieved in a simple way by means of a slotted alignment tube. When mounting an encapsulated component according to the description above, which has no connector attached thereto, on circuit boards, automatic mounting machines of standard types can be used. The connector including its optical fiber for connecting the component to the exterior is later manually mounted.

One condition which is necessary for making the connection by means of a rotation movement of the connector and its flanges is that a free space is provided, which surrounds a portion of the ferrule of the capsule inside the locking recess. The free space must be dimensioned to allow the locking flanges to enter the locking recess in order to lock the optical connector at the capsule. In the cited U.S. Pat. No. 5,617,495 no such space is provided and is not necessary since the connector is never rotated. There, instead the plate spring is compressed when after moving the connector in its longitudinal direction in order to make the connection of the optical fibers the spring is moved in the same direction. Also, the connector as described herein is made in one unit, all the parts thereof being maintained at each other, what allows an easy handling of the connector and movement of only one part for making the connection. The connection place between the ferrules is protected by the housing of the connector what increases the reliability of the connection.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWING

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawing, in which:

DETAILED DESCRIPTION

Figure 1:
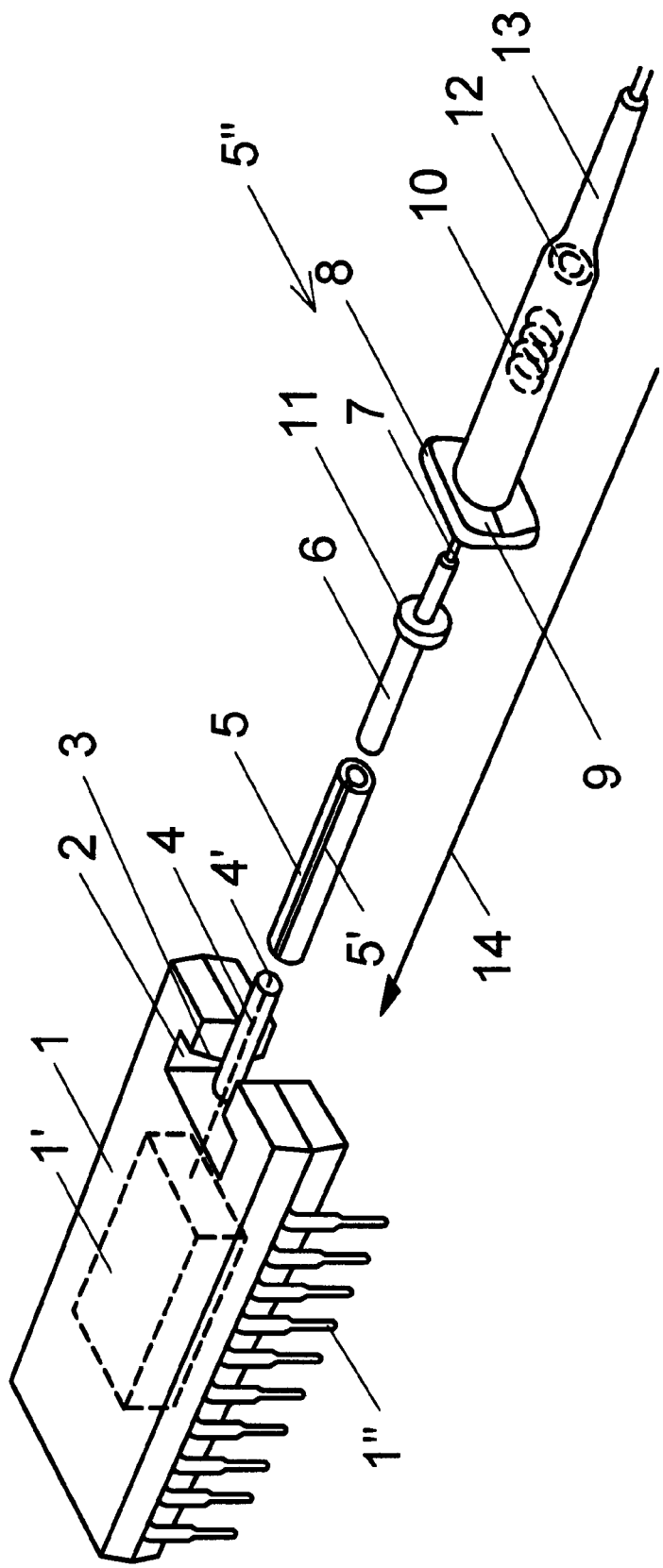
FIG. 1 is a perspective view of an optocapsule where parts needed for the optical connection are partly dismounted or shown in an exploded view.

In FIG. 1 a plastic capsule is illustrated which contains an optoelectrical element indicated at 1' and which generally has the shape of a rectangular plate including electrical contact pins 1" at the long sides thereof. At one of the short sides or the front side of the plate, at the centre of this side, a recess 2 is arranged, which in the illustrated embodiment is a cut-out having a T-shape extending through the whole thickness of the plate. The T-shape is located to be symmetric about a plane passing perpendicularly and centrally through the capsule, in parallel to the long sides thereof. The leg or web of the T-shape is located at the short side and extends therefrom and the arm portions of the T-shape are thus located well inside the rectangular shape of the capsule and in parallel with the short side of the plate. Other shapes of the cut-out are possible such as trapezoid-like shapes or generally shapes, which are more narrow at their mouths, i.e. at portions which are located closest to the short side of the plate, than at portions located further in, i.e. located closer to the interior of the capsule.

The cut-out 2 is designed to be capable of securely retaining a connector in its contact position with the capsule, so that a wave guide in the connector is pressed against an end surface of a wave guide connected to the optoelectrical element 1' placed in the capsule. Therefor the recess 2 has side edges 3, which are located at the bottom side of the arm portions of the T-shape, both extending out from the central leg or web of the T-shape, as seen in a direction from the short side towards the centre of the plate. These side edges 3 have surfaces, which are inclined both upwards and downwards in relation to a plane through the capsule, not being perpendicular thereto like other surfaces of the T-shape but forming a small angle to a plane perpendicular to the plate. Thus, centrally on the bottom sides of the projecting portions of the very T-shape a highest portion is provided, as seen in direction from the leg of the T up to the top thereof, and which thus is located closer to the interior or centre of the capsule than the adjacent portions of the bottom sides of the projecting portions. A convex or ridge-like configuration is thereby obtained which has a design suitable to being locked to a complementary designed, concave or groove-like part.

From the innermost part in the centre of the recess 2, in the longitudinal direction thereof which coincides with the longitudinal direction of the capsule, out of the centre of the capsule 2 and perpendicularly to the corresponding short side edge of the capsule a ferrule 4 projects which is a circular-cylindric rod enclosing an optical fiber 4' which is moulded into some material and extends along the geometric axis of the ferrule. Thus, the ferrule 4 extends from the portion of the recess 2 which is located furthest towards the centre of the capsule 1 and projects in the embodiment shown beyond the side edge or front edge of the capsule 1 where the recess 2 is made and is located symmetrically in the recess, along the centre line of the leg of the T-shape. The optical fiber 4' has an inner end in contact with the optoelectrical element 1' in the capsule 1 and its free, outer end in the same plane as the free end surface of the ferrule 4. Thereby its outer end is easily accessible, for example when it must be polished.

An alignment tube 5 has a longitudinal slot 5' and has an inner diameter that is somewhat smaller than the outer diameter of the ferrule 4. The alignment tube 5 has a length which is significantly larger than the free length of the ferrule 4, for example a little less than twice its length, and is made of a resilient material, such as a suitable metal.

Also, the connector 5" comprises a ferrule 6, the front portion of which is basically the same kind as the ferrule 4, i.e. it consists of a circular-cylindrical rod surrounding an optical fiber 7 which is located concentrically therewith. The front portion of the ferrule 6 has the same outer diameter as the ferrule 4. The optical fiber 7 passes inside the ferrule 6 and has a longer portion extending from the rear end of the ferrule 6. The ferrule 6 and the fiber 7 are arranged inside a connector housing 8 comprising a tubular body, which receives the rear portion of the ferrule 6 and from the rear end of which the fiber 7 extends further to some other component, not shown. The housing 8 is at its front designed complementarily to the recess 2 in the capsule 1, so that in the embodiment shown a laterally projection part configured as a substantially rectangular flange 9 is provided at that front edge surface of the housing 8 that is directed towards the capsule 1. The flange 9 fits into the arm portions of the T-shaped recess 2. The flange 9 has a front flat surface which is located perpendicularly to the longitudinal direction of the housing 8 and of the fiber 7. The flange has not a uniform thickness but its rear surface has a concave shape, so that it has its thinnest portion located at a central line parallel to the long sides of the rectangular shape. Thus, the rear surface has two weakly sloping flat surfaces, which are symmetrically located in relation to said central line.

In the body of the connector housing 8 a helical compression spring 10 is further arranged, the front end of which is engaged with a circular flange 11, arranged at the rear end of the ferrule 6, and which at its rear end is engaged with a stop or end position 12 inside the body. The stop 12 is located at a place where the connector body continues into a tapering portion 13, which has a smaller inner diameter. The tapering portion 13 has a larger flexibility when becoming more narrow and works as a protection against breaking the optical fiber 7 located therein. The flange 11 can be retained in the body of the connector housing 8 in some suitable way such as by some suitable rib, not shown, which protrudes inwardly from the inner cylindrical surface of the housing 8.

When using the optocontact it is first assumed that the connector 5" is mounted, i.e. that its ferrule 6 is arranged inside the connector housing 8, so that the front end of the ferrule is inserted through some distance in the cavity inside the body of the housing. The ferrule 6 is biased to the this front position so that it can move backwards, against the force from the spring 10. The alignment sleeve 5 is mounted on either the ferrule 4 of the capsule 1 or on the ferrule 6 of the connector 5". Then the connector 5" is moved in the direction of the arrow 14, so that the alignment sleeve 5 is applied over the other ferrule and guides the connector. When a contact is obtained between the capsule 1 and the front portion of the housing 8 first the housing 8 is turned to a suitable angular position, so that the flange 9 on the front portion of the housing can pass into and along the most narrow part of the recess 2, the leg of the T-shape. Then the long sides of the rectangular shape of the flange 9 will be located perpendicularly to the plane of the capsule 1 and in this position the housing is pressed a further distance towards the capsule. Then, finally the free end surfaces of the ferrules will come in elastic contact with each other, and then the ferrule 6 of the connector 5" can and will move a little backwards, against the force from the spring 10. When the flange 9 comes in contact with the bottom of the recess 2, the housing 8 is turned and thereby the rectangular flange 9 through an adapted angle, in the embodiment shown about 90°, so that the flange 9 is locked in the recess 2 and the ferrule 6 of the connector can move a little by the elastic action, however all the time in contact with the ferrule 4 of the capsule. The locking operation is achieved by a cooperation between the concave shape of the rear surfaces of the flange 9 and the ridge-like shape of the lower or front, inner surfaces of the T-shape. These cooperating surfaces provide a sufficient resistance to detaching the connector by turning it, if for example the angles of the co-operating flat surfaces which provide the locking operation are about 7° in relation to a plane perpendicular to the axis of the connector and to the longitudinal direction of the plate, to a long side thereof or to a perpendicular of the short side at which the recess is made respectively. When detaching the connector 5" from the capsule 1 the described operating steps are executed in the inverse order.

Other configurations of the locking recess and the complimentary configured front portion of the connector housing operating in basically the same manner as has been described above can easily be conceived by one skilled in the art. For example, the recess can have a trapezoid shape having flat sides extending from the considered side of the plate and located in an angle of e.g. 45–75° to said side. The trapezoid shape can also have ridged or arched sides, convex or concave. In the latter case the recess can then have the shape of a portion of frusto-conical surface, having a cone angle of e.g. 30–90°, the front portion of the connector housing then having the corresponding frusto-conical shape having flattened side surfaces. The side surfaces of the trapezoid shape do not have to be connected directly to the considered side of the plate, but at this side there may be a portion of the recess having a uniform width, like the leg of the T-shape as described above. The general requirement on the shape of the locking recess is obviously that it should have a narrow entrance portion located closer to the considered side of the plate and a wider inner portion located further towards the centre of the plate, some of the bottom sides of the recess having a convex or concave shape. Also, there must be enough plate at the top of the locking recess in order to permit insertion of the front portion of the connector housing in order to accomplish the locking operation.

By arranging a design of the connection of an optical fiber to a capsule as described above thus an optocapsule is provided having no fiber tail extending from the capsule which could provide difficulties when handled and instead the optocapsule has a simple and robust interface to an uncomplicated connector. The connector can comprise a short piece of an optical fiber 7 having a connector of a standard type, not shown, at its other, free end, so that a detachable, replaceable "fiber tail" or "pigtail" is obtained.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A capsule comprising: an optoelement and an optical fiber connected to the optoelement, the capsule capable of being coupled to an optical connector for contacting the optical fiber, the optical connector having locking flanges, the optical fiber extending from the optoelement to a ferrule which concentrically surrounds the optical fiber and is attached to the capsule at an inner location in a locking recess arranged in a side of the capsule, wherein a space is provided surrounding a portion of the ferrule inside the locking recess, the space allowing a rotation of the optical connector, the rotation allowing the locking flanges entering the locking recess to lock the optical connector to the capsule.

2. The capsule of claim 1, wherein the locking recess has inner surfaces which are at least partly convexly shaped.

3. The capsule of claim 1, wherein the locking recess has a T-shape including a central leg or web, the central leg or web extending from the side of the capsule.

4. The capsule of claim 3, wherein the T-shape of the locking recess has side portions in which surfaces, which are directed substantially parallel to the side of the capsule, are convex or have a ridge shape.

5. The capsule of claim 3, wherein the T-shape of the locking recess has side portions in which surfaces, which are directed substantially parallel to the side of the capsule, have the shape of sloping flat surfaces, which form a roof-like configuration.

6. An optical connector for contacting a first optical fiber in a first device, separate from the optical connector, with a second optical fiber included in the optical connector, the optical connector comprising:

a tubular body and a cylindrical first projecting part, the cylindrical first projecting part projecting from a front end surface of the tubular body, the tubular body and the cylindrical first projecting part concentrically surrounding the second optical fiber and the tubular body carrying a second projecting part projecting laterally or transversely from the tubular body forming a continuation of the front end surface of the tubular body and having such a shape that when the optical connector is rotated, the second projecting part is capable of being locked in a locking recess in the first device.

7. The optical connector of claim 6, wherein the second projecting part is a flange.

8. The optical connector of claim 7, wherein the flange has a rear surface having a concave shape for cooperating with a locking recess having a convex shape at corresponding places.

9. The optical connector of claim 8, wherein the rear surface of the flange has the shape of a shallow groove having a longitudinal direction parallel to long sides of the flange.

10. The optical connector of claim 6, wherein the second projecting part is a flange having a substantially rectangular shape taken in a longitudinal direction of the tubular body and the first projecting part.

11. An optical connector of claim 6, further comprising elastic means for pressing the connector and thereby the first and second projecting parts, in the case where they are mounted in a locking recess, in a direction parallel to a longitudinal direction of the cylindrical part, away from the locking recess.

12. An optical connecting device for making a first optical fiber contact a second optical fiber, the optical connecting device comprising:

a plate-shaped body at which the first optical fiber is located, a locking recess made in a side of the plate-shaped body, the first optical fiber having an end located at the locking recess, a connector separate from the plate-shaped body, and a substantially cylindrical portion of the connector which concentrically surrounds an end portion of the second optical fiber, a locking part arranged at a front end of the cylindrical portion and projecting laterally or transversely from the cylindrical portion, the locking part having such a shape that when inserted in the locking recess and rotated, the locking part is locked in the locking recess, whereby the connector is locked to the plate-shaped body.

13. The optical connecting device of claim 12, further comprising:

first ferrule, which concentrically surrounds an end portion of the first optical fiber and projects from an inner surface of the locking recess, a second ferrule, which concentrically surrounds an end portion of the second optical fiber and is located at least partly inside the substantially cylindrical portion of the connector, wherein when the connector is locked to the plate-shaped body front end surfaces of the first and second ferrule are in contact with each other.

14. The optical connecting device of claim 13, wherein the second ferrule is elastically mounted in the connector, so that it can move when its front end surface is in contact with a front end surface of the first ferrule, in a direction away from the first ferrule, whereby a compressive force is applied over the front end surfaces of the ferrules, so that they are pressed with some force against each other.

* * * * *